United States Patent [19]

Rice

[11] Patent Number: 5,188,059
[45] Date of Patent: Feb. 23, 1993

[54] AMUSEMENT DEVICE AND BED FOR CATS
[76] Inventor: Gillian S. Rice, 350 Detroit, Denver, Colo. 80206
[21] Appl. No.: 354,768
[22] Filed: May 22, 1989
[51] Int. Cl.[5] .................. A01K 1/035; A01K 29/00
[52] U.S. Cl. ................................ 119/28.5; 119/29; 273/123 R
[58] Field of Search ............ 119/1, 15, 19, 29, 28.5; 273/113, 115, 116, 123 R, 3 R

[56] References Cited

U.S. PATENT DOCUMENTS

| | | | |
|---|---|---|---|
| 1,410,295 | 3/1922 | Hammond | 273/115 |
| 2,540,309 | 2/1951 | Winsor | 119/29 |
| 2,788,974 | 4/1957 | Pick | 273/115 |
| 2,900,956 | 8/1959 | Hoffman | 119/1 X |
| 3,323,797 | 6/1967 | Horton, Jr. | 273/3 R |
| 3,552,356 | 1/1971 | Rosenthal | 119/29 |
| 3,556,527 | 1/1971 | Margolis et al. | 273/115 |
| 3,648,403 | 3/1972 | Gommel | 119/29 X |
| 3,989,008 | 11/1976 | Neumann | 119/19 X |
| 4,722,999 | 2/1988 | Mohr | 119/29 |

FOREIGN PATENT DOCUMENTS

| | | | |
|---|---|---|---|
| 0467437 | 9/1914 | France | 119/1 |
| 0037090 | 7/1906 | Switzerland | 119/1 |
| 0250286 | 6/1948 | Switzerland | 119/1 |

Primary Examiner—Robert P. Swiatek
Assistant Examiner—Todd E. Manahon
Attorney, Agent, or Firm—Finnegan, Henderson, Farabow, Garrett & Dunner

[57] ABSTRACT

An apparatus designed to entertain and exercise cats and also serve as a bed for cats. The apparatus is constructed from a box with open top having fabric stretched across the top and having holes cut in the corners and with a flap in the middle. These openings are large enough for a cat's paws and shoulders. The cat reaches inside to grab for a ball placed inside the box. Besides being a sleeping apparatus, it doubles as a game that provides entertainment and exercise for the cat since it appeals to the animal's strategic nature.

20 Claims, 1 Drawing Sheet

AMUSEMENT DEVICE AND BED FOR CATS

BACKGROUND OF THE INVENTION

The present invention relates to a combination amusement device and bed for cats.

SUMMARY OF THE INVENTION

The invention relates to an exercise, amusement and sleeping device for felines comprising:
(a) a rigid base enclosed by a contiguous sidewall having one or more sides, a closed bottom and an open top, and
(b) a resilient flap or non-rigid covering stretched across the top of the base and attached to the top of the sidewall, the covering having cut-out portions or holes which permit the feline partial access to the interior of the base.

The cut-out portions of the covering may be positioned over the corners of the walled base. In one embodiment, the cut-out portions are of two different sizes.

In a preferred embodiment, the covering is made of two resilient portions partially attached alongside each other, thereby forming a slit portion between the resilient portions.

The flap is preferably made of leather. Alternatively, the flap is of clear material.

In one embodiment, the base or enclosure is a rectangular box having four sides forming the contiguous sidewall. Alternatively, the base may have six sides. In another alternative embodiment, the base may have an oval shape.

One object of the present invention is to provide a sleeping apparatus for a cat that is appealing to felines because of its suspended, hammock-like effect.

A further object of the invention is to provide a game apparatus that entertains as well as exercises the cat as the animal tries to capture a concealed ball.

Another object of the invention is to provide a source of mental stimulation to the cat as it appeals to the animal's strategic nature and to provide a source of amusement to the cat's owners.

DESCRIPTION OF PREFERRED EMBODIMENTS

Figure 1:
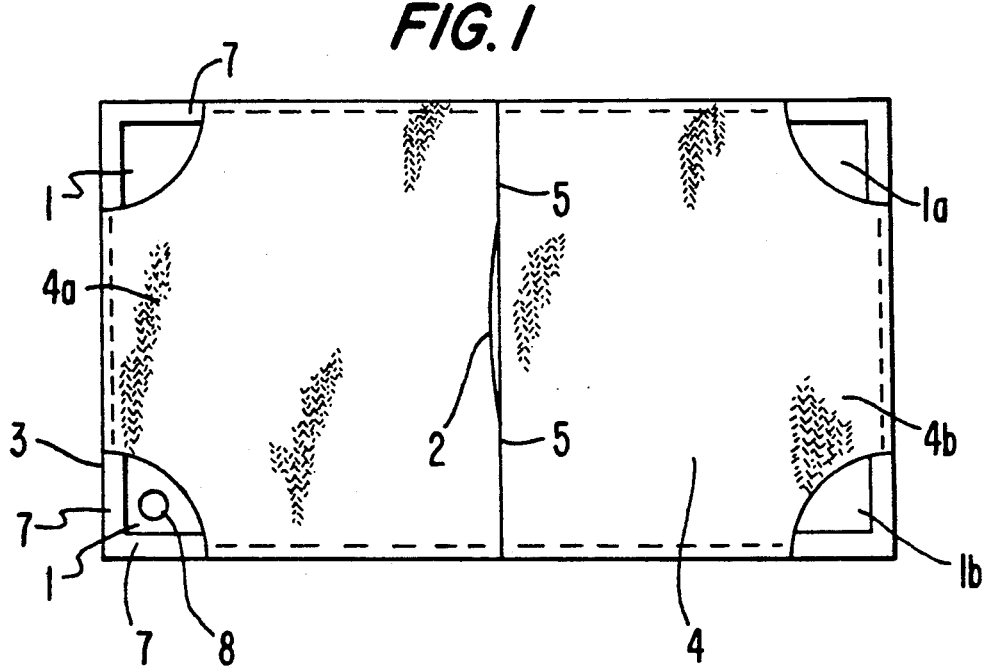
FIG. 1 is a top view of a preferred embodiment of the invention.
Figure 2:
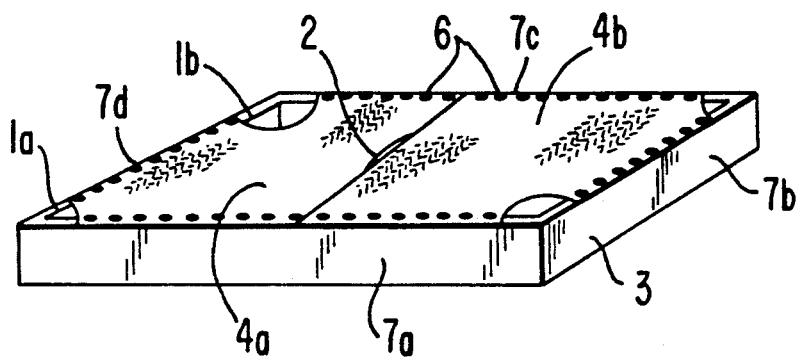
FIG. 2 is a side view of the embodiment shown in FIG. 1.
Figure 3:
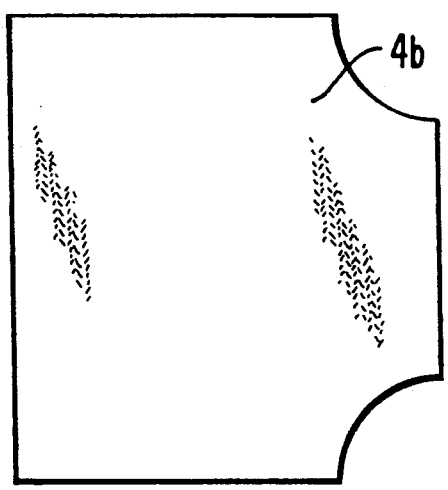
FIG. 3 is a view of one-half of the top covering of the device depicted in Figure 1.

The apparatus is constructed from a rigid box or base 3 having an open top with a fabric covering 4 stretched across the top (see FIGS. 1 and 2). The fabric 4 can be leather, Naugahyde, cloth, etc. Preferably, the box 3 (which can be wooden, plastic, cardboard, etc.) is approximately 14"×24" and 2.5" deep, with a 0.5" sidewall 7 having four sides 7a–7d, but other dimensions and shapes are possible provided they allow a cat to manipulate, with its paws, a ball 8 placed inside the box 3. The material covering 4 comes in two sections which are partially stitched or otherwise partially attached along central seams 5 connecting the pieces 4a and 4b. A single piece or section of fabric 4b is shown in FIG. 3. The center of the seam between the two fabric pieces is not stitched, which permits a slit portion 2 to remain between the fabrics 4a, 4b and above the center of the box. This acts as a "hole" 2 for the cat to push the ball through from under the fabric 4.

The other four "holes" 1 are cut in the corners of the fabric. When the fabric is stretched above the box, the holes 1 are in the four corners of the table, if the fabric is thought of as the surface of a pool table. These are similar to the six pockets of a billiard table. Other variations of the invention have six or more holes in the table, with any number being along the sides of the surface, and one or similar number of holes cut in the seam that joins the two pieces.

In the embodiment illustrated in the drawings, the four holes 1 are of two different sizes, with the holes of like size being on opposite corners of the box 3. The larger holes 1a (4" radius in a preferred embodiment) permit the cat to place its foreleg or arm and shoulder under the fabric and into the box. The smaller holes 1b (3" radius in a preferred embodiment) permit the access of the cat's paws only, and also the ball 8. Ideally the ball 8 is a ping pong ball, as cats seem to have an attraction for these, but any ball that can fit under the fabric 4 will do.

Since the fabric 4 is stretched across the top of the box 3, the fabric can also double as a bed for the cat. Preferably the fabric 4 is leather and attached to a wooden box 3, but other materials are possible; for example the fabric 4 can be vinyl (Naugahyde) and the box 3 can be wood. The fabric 4 can be attached in any way that secures it to the top of the box 3, but brass upholstery studs 6 are preferred from an aesthetic point of view.

To use the device as a game, a ping-pong ball 8 is placed in the box 3. The cat has 5 points of access: two corner holes 1a large enough for the cat's paws, two corner holes 1b large enough for the cat's arm and shoulder, and the flap 2 in the middle. Eventually the cat will learn to reach through this flap 2 in an attempt to reach the ball 8. The typical cat is instantly intrigued—it can hear the ball rolling around inside the box 3 and will dive and pounce on the ball as it appears in the corner holes 1.

The invention is not merely a toy, but appeals to the cat's strategic nature in a formalized game of cat and mouse. The cat will attempt to "stalk" the ball from under the fabric or pounce on the ball as it appears in the corner. It provides exercise and entertainment for the animal, while owners are amused by the cat's antics as it stalks its prey. As the cat plays it will do gymnastics.

The only similar product known is "Cat-a-combs," an amusement toy with openings in it. In comparison, the invention is advantageous because:

1) As the ball moves under the fabric it cannot be seen, which leaves the cat ignorant of the ball's source of movement and therefore curious of the apparently "animate" ball. A ping pong ball is employed, which cats like. In contrast, "Cat-a-combs" does not include a play piece but suggests that cats will try and retrieve their toys from the object. However, many cat toys are inanimate (e.g., a catnip stuffed mouse) and will not move around at all. The sound of the ping pong ball inside the box will intrigue a cat because he cannot see it. Further, the invention preferably leaves a majority of the area of the box covered with opaque leather/fabric. The cat only sees the ball when it rolls into a corner. "Cat-a-combs" does not leave a large area covered and the cat can see through almost the entire surface area. The present invention is better because the ball is deliberately concealed from the cat. The cat will understand that the ball is there and is moving under the leather/fabric.

2) The invention also functions as a bed whereas "Cat-a-combs" does not. The invention functions as a bed that cats like because of the suspended fabric/leather which creates a soft, hammock-like effect. And, when real leather is used, most cats will be attracted to the bed immediately (it is common for cats to sit on leather whenever they are given the opportunity to do so).

3) Cats love ping-pong balls. "Cat-a-combs" does not teach the importance of a moving ball in games of this manner. Cats play with the present invention for hours. Eventually the cat will retrieve the ball and bat it around the house or yard. It may lose the ball or lose interest in playing with it—put the ball back in the box and the game starts anew. The game gets even more lively when more than one cat plays.

While not wishing to be bound by any theory to explain why cats are entertained by the present invention, the following is typical cat behavior: if you throw a cat a ball or a wadded up piece of paper, the cat bats it around till it ends up under a chair; the cat then runs around the other side of the chair leg, peeks at the ball from behind the chair leg, and then reaches around the leg to bat at the ball. The cat knows the ball/quarry is inanimate and what it is doing is making its game more interesting, by placing an obstacle between itself and the ball/quarry. The invention takes advantage of this naturally strategic nature by "teasing" the cat's innate inquisitiveness. The ball/quarry responds to the cat's movements, but the cat cannot figure that out and believes the ball is moving of its own accord . . . just like a real "mouse" would. Hence the game instinctively appeals to a cat's basic trait, i.e. to be a hunter.

The invention has a pleasant appearance, somewhat resembling a piece of furniture; it may be provided in different colors to fit in with individual decor; it does not look out of place on the living room floor, unlike "Cat-a-combs" which definitely looks like a toy.

The preferred embodiment is made of wood and leather. The box is preferably made of a cheap wood such as pine, and stained to offer the consumer a variety of shades. Likewise, the leather may be a variety of colors. For example, a consumer with a powder blue decor might prefer an embodiment of the invention in a blonde wood stain with powder blue leather. A consumer with an antique decor might desire a dark walnut stain with burgundy leather. The leather would be preferably attached to the top sides of the box with brass upholstery studs, such as those used in fine leather furniture.

This is the preferred embodiment for two reasons. First, in wood and leather, the inventive device almost looks like a piece of furniture, especially if it matches the decor, and will not look out of place in the middle of a living room floor. Second, cats are attracted to leather, and this enhances the device's function as a bed. The box could be made of plywood, fibre board, cardboard (although this is not preferred) or even molded plastic. The covering is preferably leather for a deluxe embodiment and vinyl/Naugahyde for a typical embodiment. However, a fabric such as denim or canvas can be employed for the top covering. Additionally, the fabric/leather could be attached to the box using a number of other means, such as staples, glue, etc.

The original concept and ideal embodiment is made of wood and leather, with the leather attached with brass studs. Cats are very attracted to leather which enhances its use as a bed; however, in view of cost, the leather would be used in a deluxe embodiment. A basic embodiment would be made with fiber board and vinyl (Naugahyde).

Obviously, there are numerous variations on the number of balls, flaps, and holes. For example, one option is to have a round shape with a similar flap across the middle and from 4 to 6 holes along the circle's perimeter. Optionally, the device could be triangular. Regarding the rectangular embodiment illustrated in the figures, another alternative is to have no flap in the middle, and six instead of four holes. Since the other two holes would be middle openings at the midpoint of the long sides of the rectangle, the end product would look even more like a real pool table with six pockets. Preferably, the size of the openings would vary just as they do in the illustrated embodiment. This alternative embodiment would appear more like a pool table and may thus be more preferred. Alternatively, the covering could be a see-through covering of some sort, such as clear plastic or vinyl.

I claim:

1. A bed and amusement device for cats, comprising:
   (a) a rigid base including a contiguous sidewall, a closed bottom and an open top; and
   (b) a covering of non-rigid fabric stretched across said open top of the base, wherein said covering has defined therein:
      (i) a middle opening of a size to permit insertion of a cat's paw therethrough; and
      (ii) one or more cut-out portions adjacent the sidewall of the base, said one or more cut-out portions each being of a size to permit insertion of the cat's paw therethrough; and
   (c) means for attaching said covering to the top of said base along the contiguous sidewall.

2. A device as recited in claim 1, wherein said sidewall has at least four sides.

3. A device as recited in claim 2, wherein said sidewall has four sides forming a rectangular enclosure.

4. A device as recited in claim 3, wherein said fabric is selected from the group consisting of leather, vinyl, canvas and denim.

5. A device as recited in claim 4, wherein said attaching means are brass studs.

6. A device as recited in claim 4, wherein said base is made of wood.

7. A device as recited in claim 6, wherein said one or more cut-out portions comprise a corner hole overlying a corner between two adjacent sides of the base.

8. A device as recited in claim 7, wherein said covering comprises two sections of the fabric partially stitched together along a central seam adjacent two of the opposing sides of the sidewall, thereby defining said middle opening as a central slit.

9. A device as recited in claim 3, wherein said base has a length of 24 inches, a width of 14 inches, and a height of 2.5 inches.

10. A device as recited in claim 3, wherein said covering comprises two sections thereof partially stitched together along a central seam adjacent two of the opposing sides of the sidewall, thereby defining said middle opening as a slit.

11. A device as recited in claim 10, wherein said one or more cut-out portions comprise a corner hole overlying each corner of the base.

12. A device as recited in claim 11, wherein said fabric is leather and said attaching means are brass studs.

13. A device as recited in claim 11, wherein said cut-out portions consist of four semi-circular corner holes of two different sizes.

14. A device as recited in claim 13, wherein said corner holes consist of a first pair sized to permit passage of a cat's paw and a ping-pong ball therethrough but not the cat's entire foreleg and shoulder, and a second pair sized to permit passage of a cat's entire foreleg and shoulder therethrough.

15. A device as recited in claim 14, wherein said first pair of corner holes are located on diagonally opposite corners of the base.

16. A device as recited in claim 15, wherein said base is made of wood.

17. A device as recited in claim 16, wherein said fabric is opaque.

18. A device as recited in claim 17, wherein said attaching means are studs.

19. A device as recited in claim 11, wherein said base has a length of 24 inches, a width of 14 inches, and a height of 2.5 inches.

20. A device as recited in claim 1, further comprising a ball inside said base, said sidewall being of a height greater than the diameter of said ball.

* * * * *